Jan. 26, 1937. P. D. D'ALMEIDA 2,068,642
IDENTIFICATION NEST FOR DOMESTIC FOWL
Filed Sept. 29, 1933 10 Sheets-Sheet 1

Inventor:
Philemon Duarte D'Almeida
By
Hawke D. Penney, Attorney.

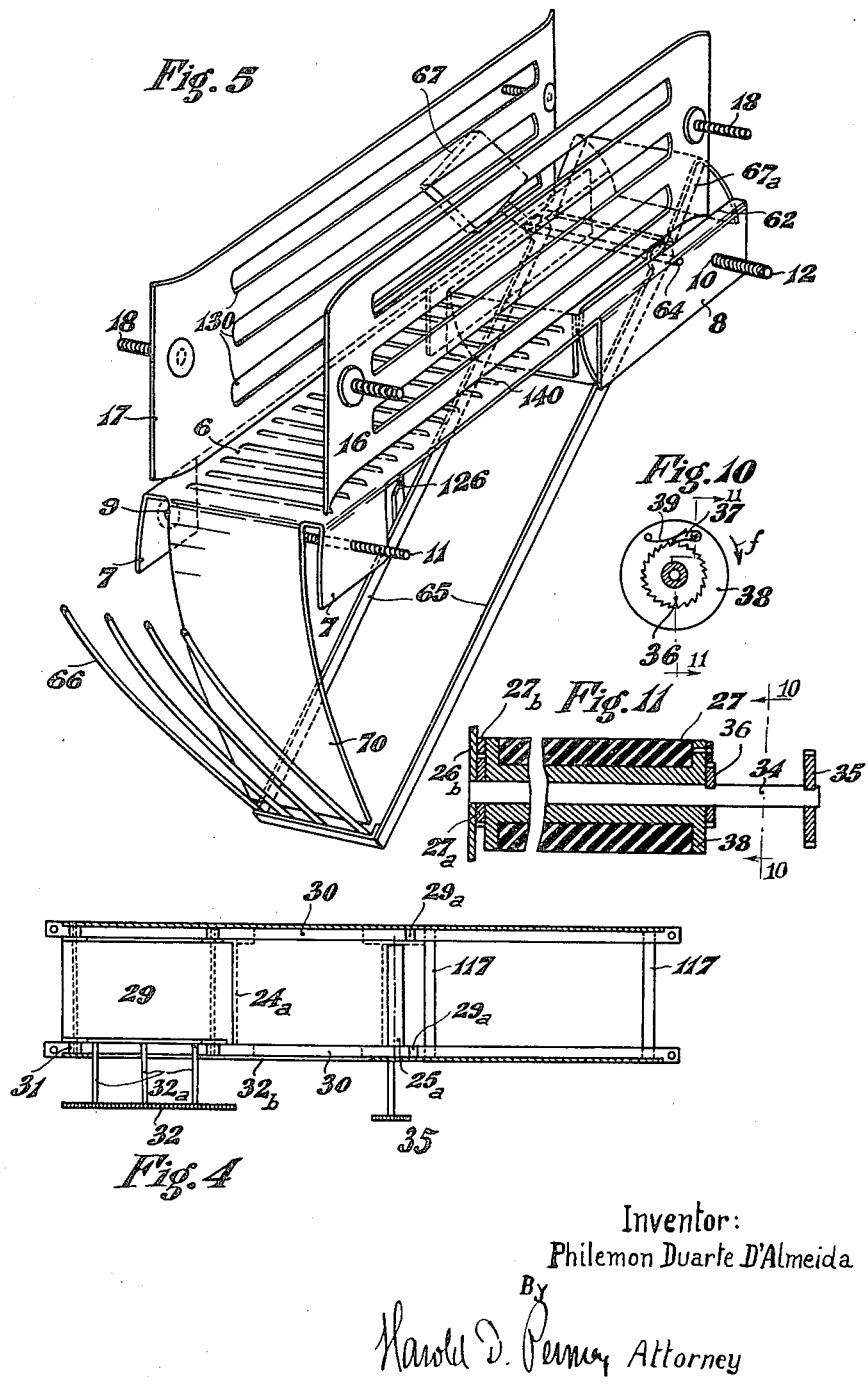

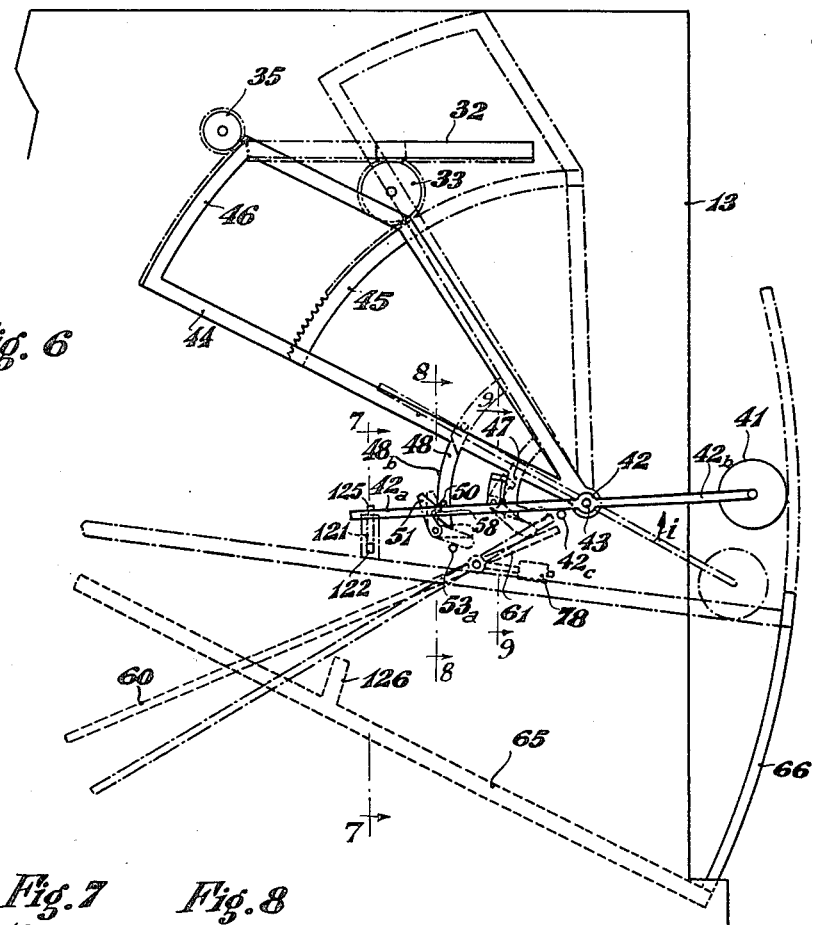

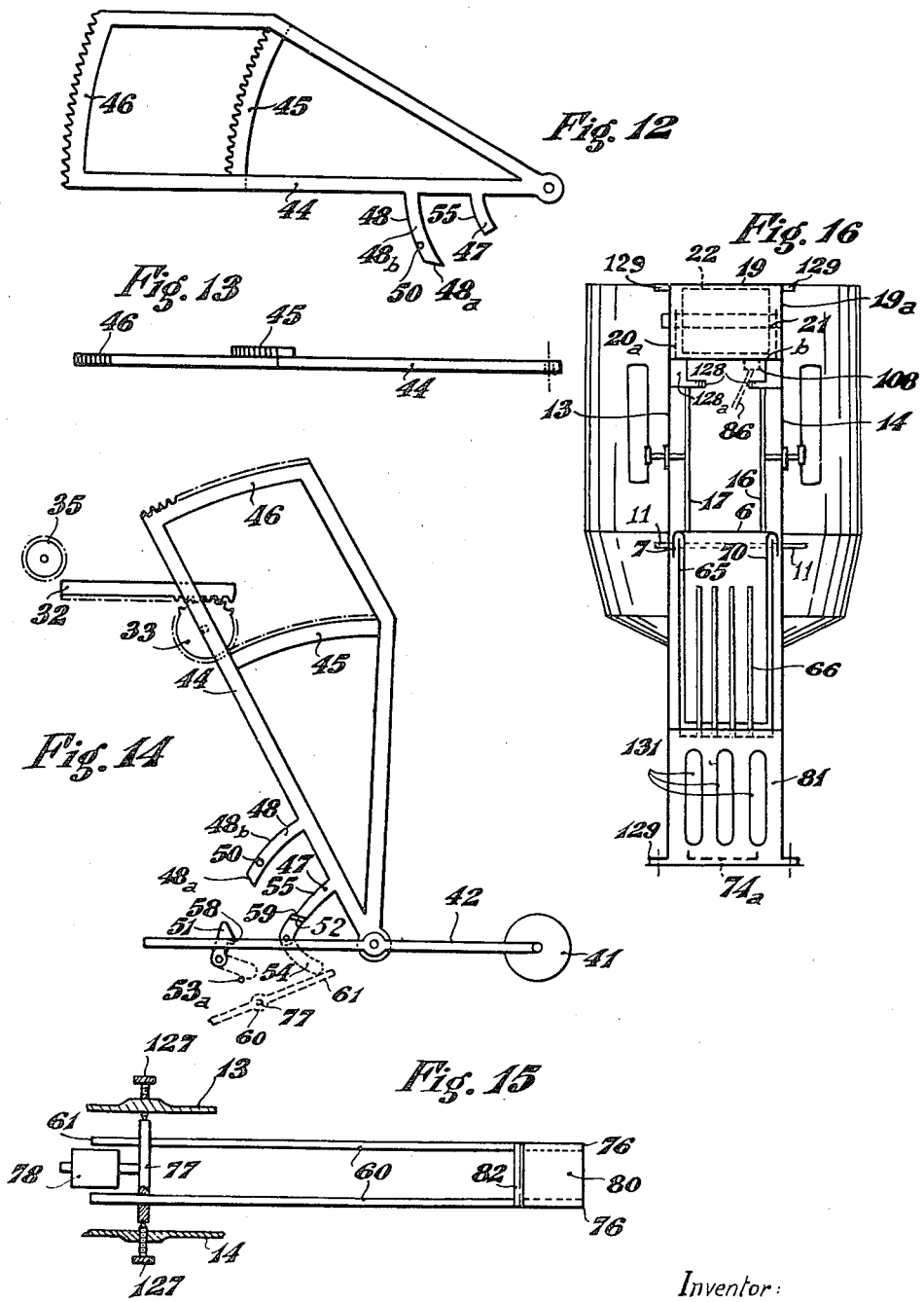

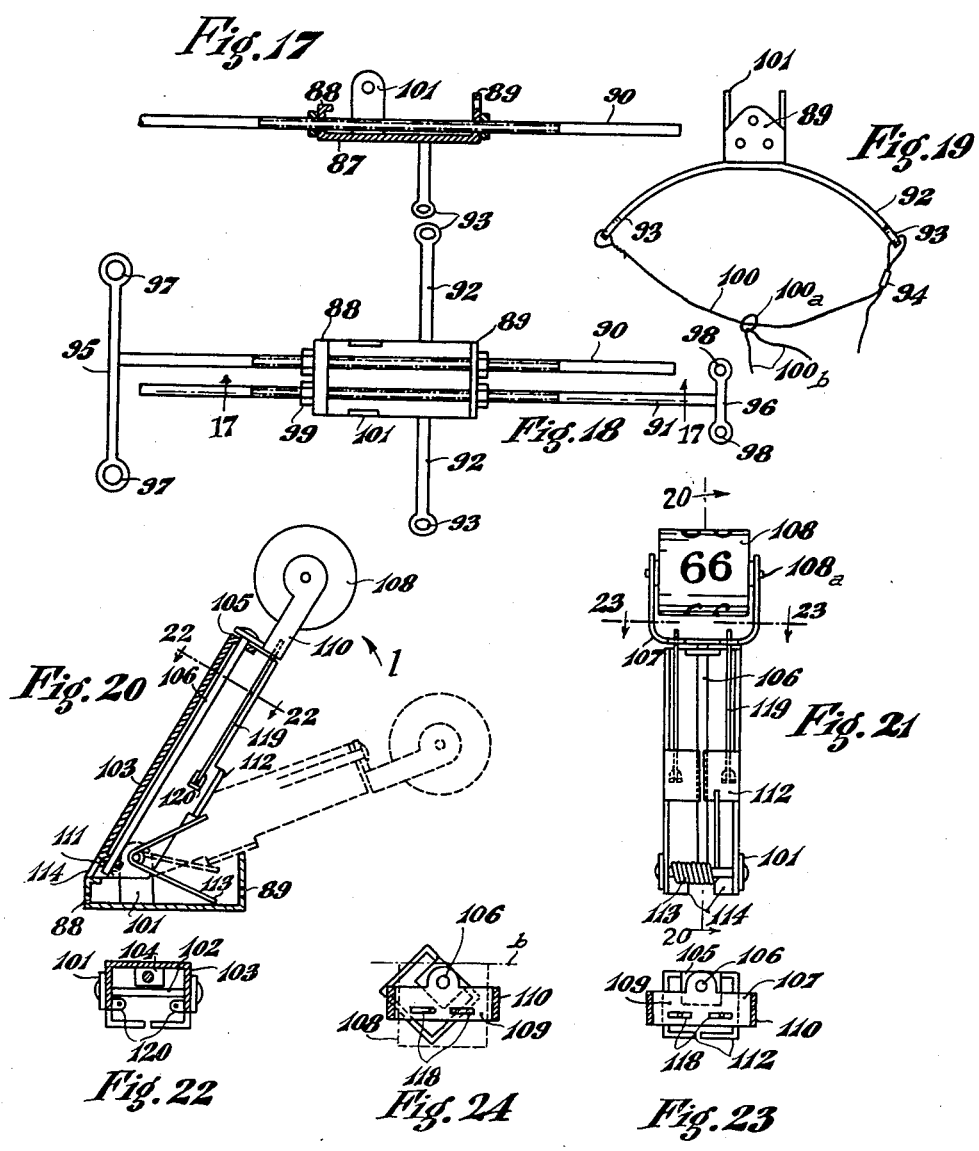

Jan. 26, 1937.  P. D. D'ALMEIDA  2,068,642
IDENTIFICATION NEST FOR DOMESTIC FOWL
Filed Sept. 29, 1933   10 Sheets-Sheet 6

Inventor:
Philemon Duarte D'Almeida
By
Harold D. Penney   Attorney.

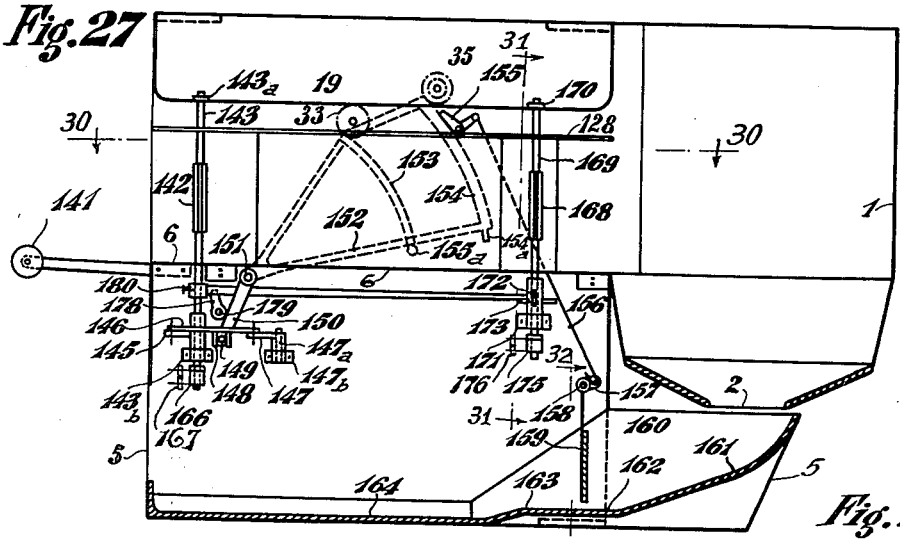
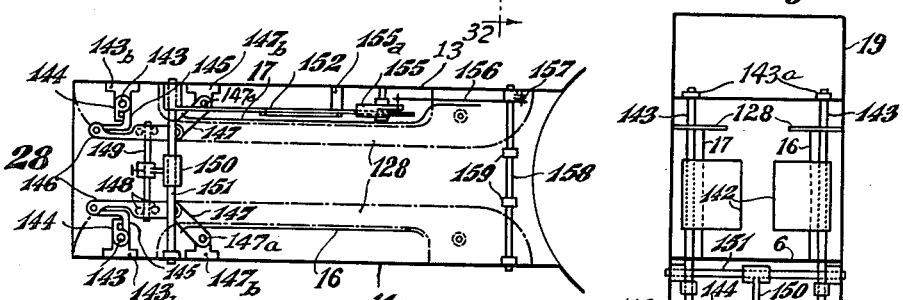
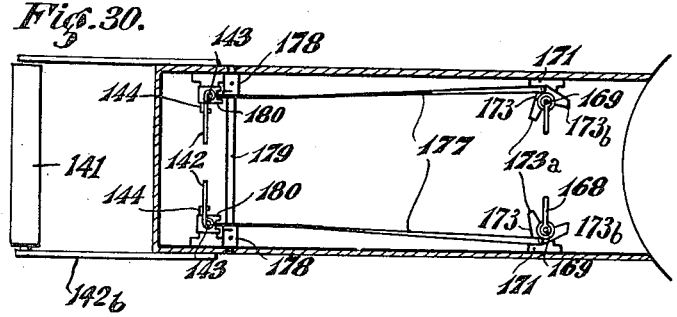
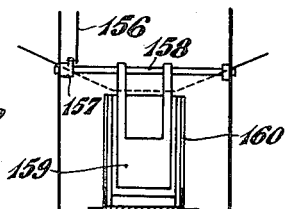

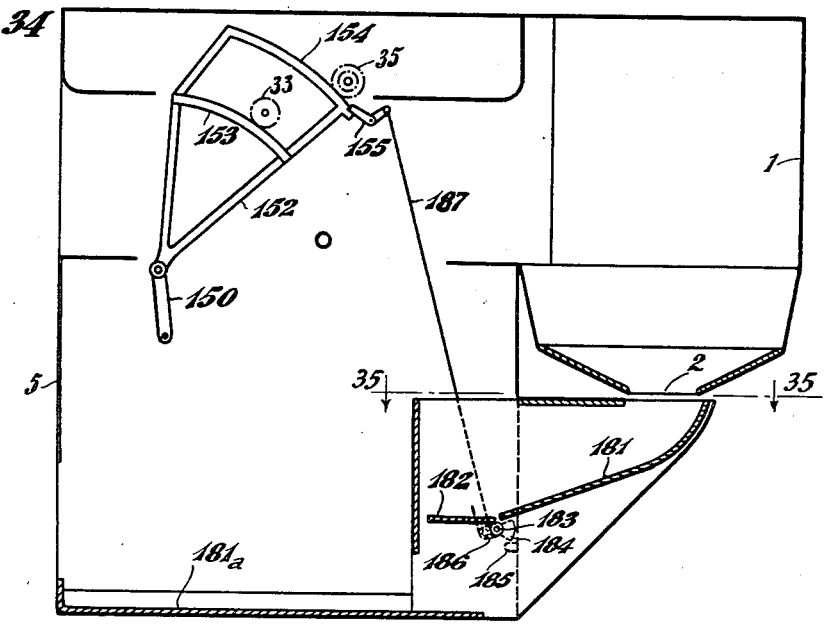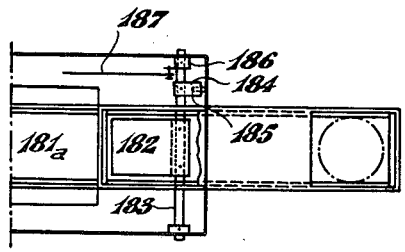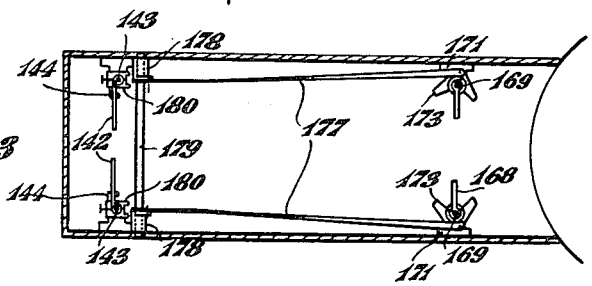

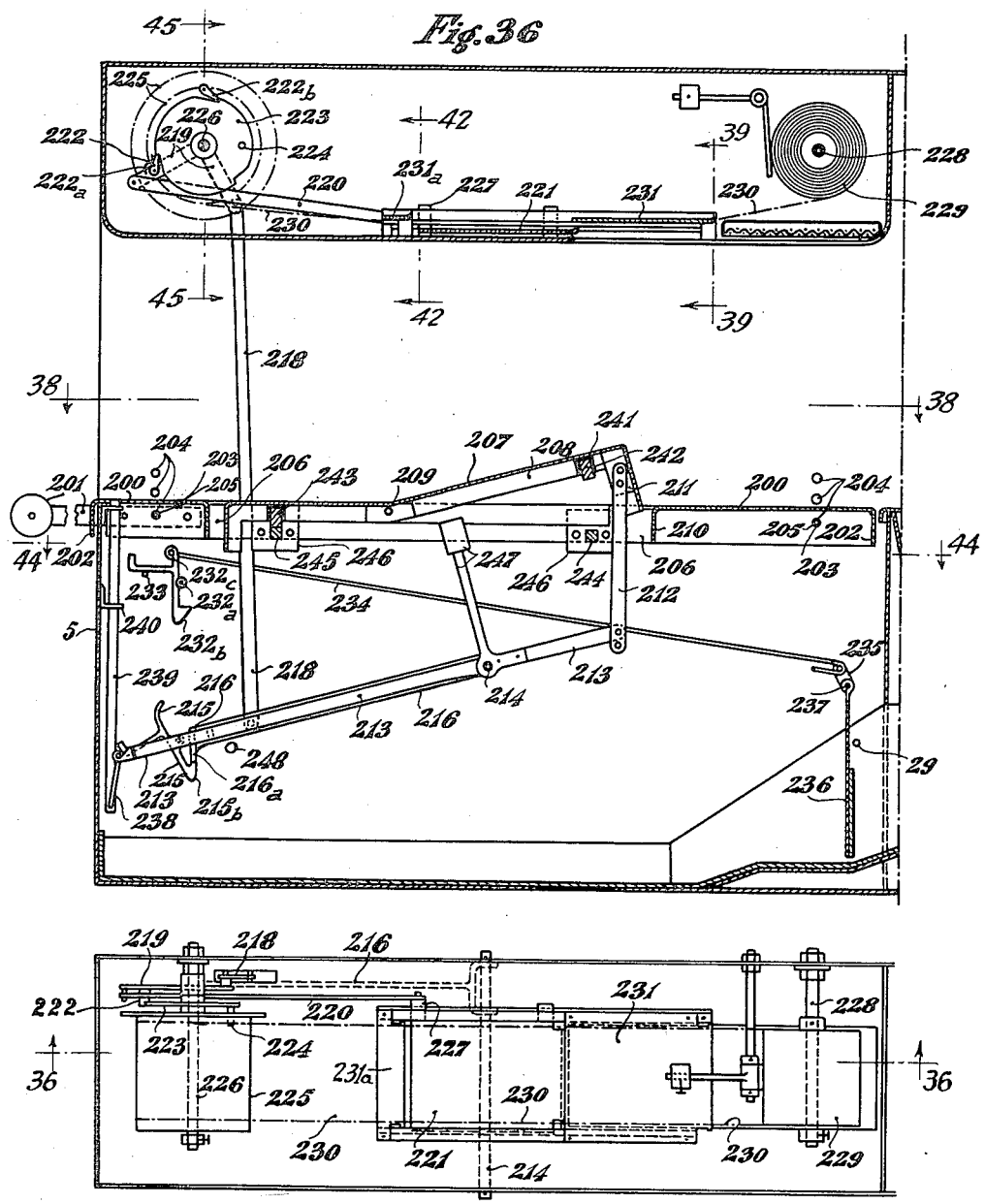

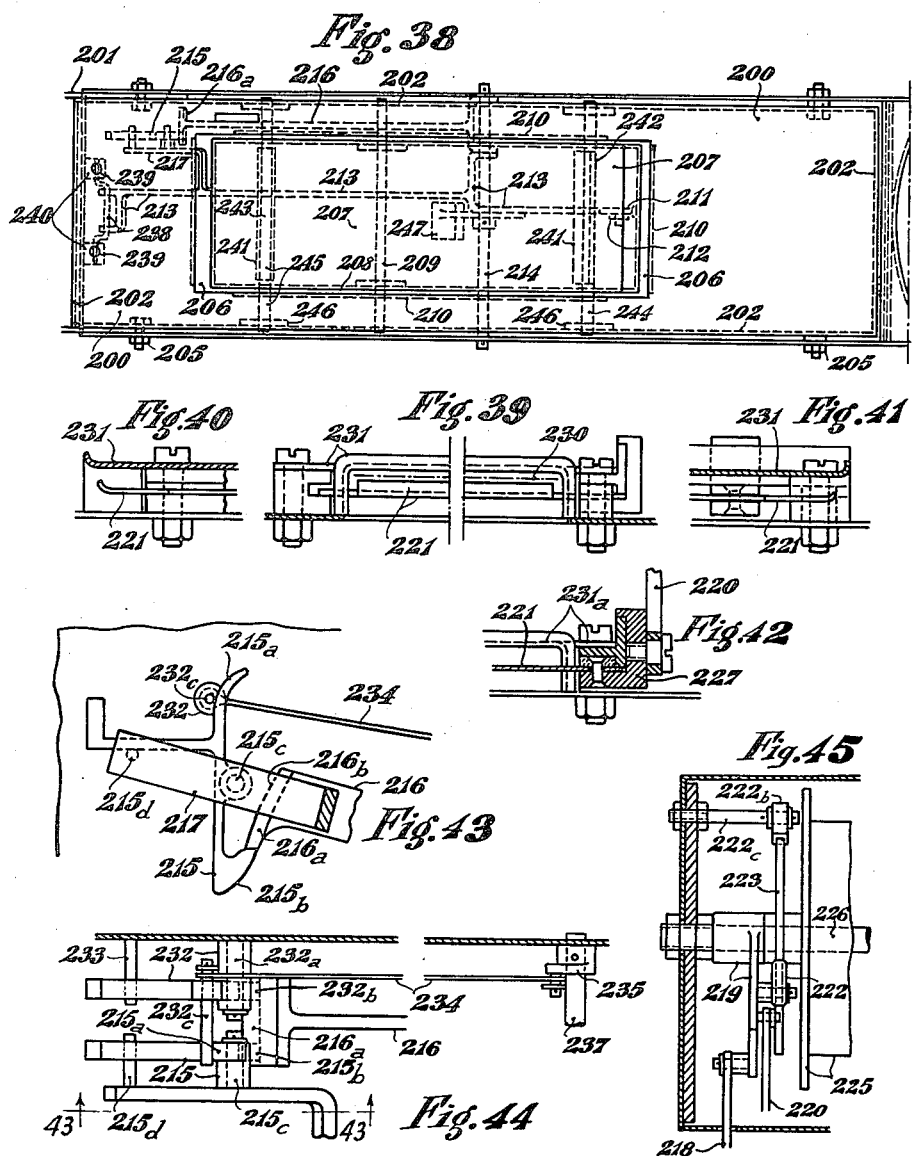

Patented Jan. 26, 1937

2,068,642

UNITED STATES PATENT OFFICE 2,068,642

IDENTIFICATION NEST FOR DOMESTIC FOWL

Philemon Duarte d'Almeida, Geneva, Switzerland

Application September 29, 1933, Serial No. 691,451
In Germany September 30, 1932

14 Claims. (Cl. 119—47)

This invention relates to identification nests for domestic fowls, such as are used in poultry farms for selecting the laying hens, ducks, turkeys, geese or other fowls, and particularly to such types of apparatus comprising a nest chamber and a passageway leading to the nest chamber and containing a recording band cooperating with a stamp carried by the fowl for marking a distinguishing sign, corresponding to the identification mark of the fowl, upon this latter traversing the passageway.

The principal object of the invention is the provision of an apparatus of the mentioned type which is arranged so that recording of a fowl can occur only when the bird leaves the nest and only when the leaving bird has laid an egg.

With the above and other objects in view the invention consists in the combination and arrangements of parts as fully described in the following specification, illustrated in the accompanying drawings and pointed out in the appended claims.

In the drawings, which are partly diagrammatic in character;

Figure 4 is a plan of the recording device seen from below. This view is taken in section on the line 4—4 of Fig. 3.

Figure 5 is a perspective view of the passage leading to the nest chamber.

Figure 6 shows in elevation and diagrammatically a part of the mechanism actuating the recording device.

Figure 7 is a vertical section taken on the line 7—7 of Fig. 6 and showing part of the actuating mechanism for the recording device in elevation.

Figure 8 is a vertical section taken on the line 8—8 of Fig. 6 and showing a latching device in perspective.

Figure 9 is a section taken on the line 9—9 of Fig. 6 and showing a bracket support in perspective.

Figure 10 is a vertical section taken on the line 10—10 of Fig. 11 and showing ratchet mechanism in elevation.

Figure 11 is a vertical detail section taken on the line 11—11 of Fig. 10.

Figures 12 and 13 are an elevation, and a plan, respectively of a member of the actuating mechanism for the recording device.

Figure 14 is a view analogous to that shown in Fig. 6, but showing the parts in another position of operation.

Figure 15 is a horizontal sectional view taken on the line 15—15 of Fig. 1 and showing in detail part of the actuating mechanism.

Figure 16 is a diagrammatic front view of the apparatus.

Figure 17 is a longitudinal sectional view taken on the line 17—17 of Fig. 18. These views illustrate the structure of a printing device carried on the back of a hen, as seen in Fig. 25.

Figure 18 is a plan view of the structure shown in Fig. 17.

Figure 19 is an elevational view of a metal strap or saddle member which is fixed to the bottom of said device.

Figure 20, taken on the line 20—20 of Fig. 21, is a vertical section at view of the printing device.

Figure 21 is a partial rear elevational view of the said device, some of the parts being omitted.

Figure 22 is a horizontal sectional view taken on the line 22—22 of Fig. 20.

Figure 23 is a horizontal sectional view taken on the line 23—23 of Fig. 21.

Figure 24 is a section analogous to that of Fig. 23 but showing the printing member in another position of operation.

Figure 25:
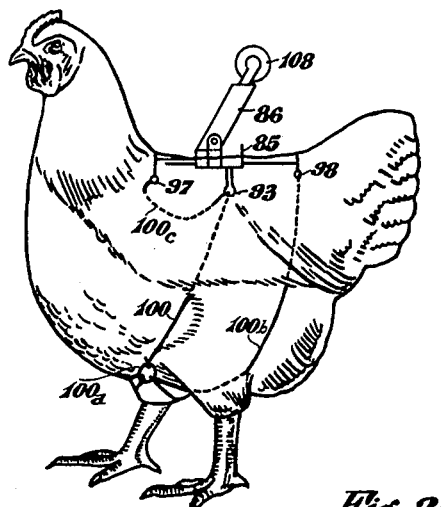

Figure 25 shows the printing member placed on the back of a hen.

Figure 1:
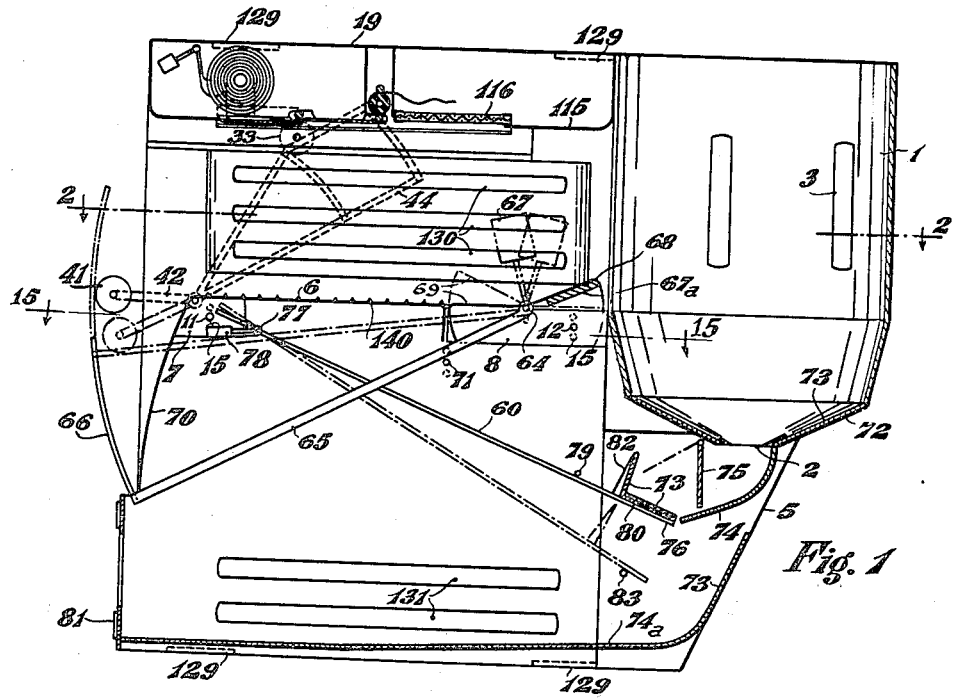
Figure 1 is a semi-diagrammatical sectional view through an identification nest according to the invention. This view is taken on the line 1—1 of Fig. 2.
Figure 2:
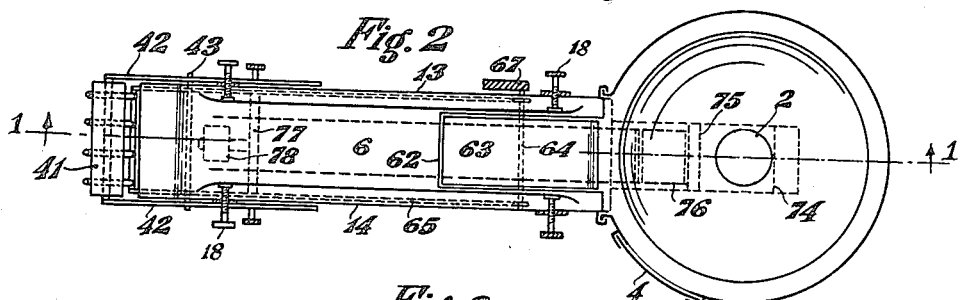
Figure 2 is a section along the line 2—2 of Fig. 1.
Figure 26:
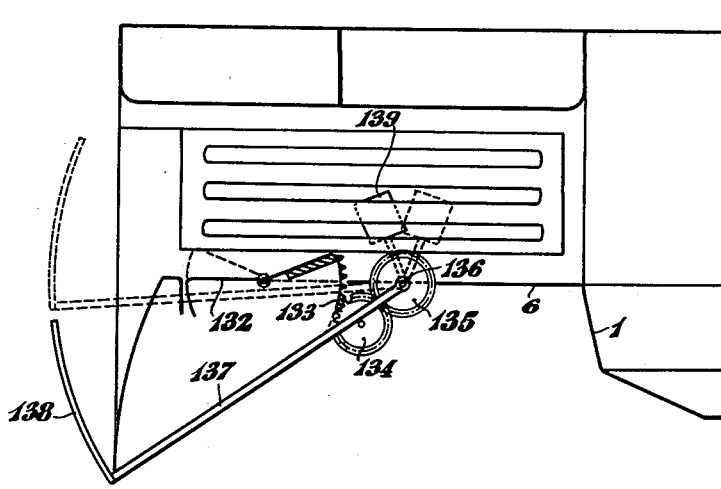

Figure 26 is a view similar to Fig. 1, but showing a different form of closure-operating means.

Figures 27 to 35 concern a second embodiment of the invention.

Figure 27 is a longitudinal section similar to Fig. 1, but taken through an identification nest according to this second embodiment.

Figure 28 is a partial plan view of the actuating mechanism of the recording device, some of the parts being broken away or omitted.

Figure 29 is a fragmentary front elevation of the apparatus.

Figure 30 is a horizontal sectional view taken on the line 30—30 of Fig. 27 and showing the locking means for the doors opening or closing the entrance into the passage.

Figure 31 is a vertical section taken on the line 31—31 of Fig. 27 and showing a front elevation of these locking means.

Figure 32 is a vertical sectional view taken on the line 32—32 of Fig. 27 and showing in elevation an egg-operated lid and associated structure.

Figure 33 is a sectional view analogous to that of Fig. 30 but showing the members in another working position.

Figure 34 is a semi-diagrammatic sectional view similar to Fig. 27, but showing a modification of the actuating means for the recording device.

Figure 35 is a horizontal sectional view taken on the line 35—35 of Fig. 34 and showing a portion of this modification.

Figures 36 to 45 concern a third embodiment of the invention.

Figure 36 is a fragmentary semi-diagrammatic sectional view partly in elevation and showing the apparatus according to the third embodiment. This view is taken on the line 36—36 of Fig. 37.

Figure 37 is a plan of the recording device and of a part of its operating means.

Figure 38 is a horizontal sectional view taken on the line 38—38 of Fig. 36 and showing the floor of the passage leading to the nest and a part of the operating means of the opening and closing device of the passage.

Figure 39 is a vertical section taken on the line 39—39 of Fig. 36 and showing a part of the recording device in elevation.

Figure 40 is a detail view showing in vertical section a fragment of the structure illustrated as in Fig. 39.

Figure 41 is a detail view also showing in vertical section a fragment of the structure illustrated in Fig. 39.

Figure 42 is a vertical sectional detail view taken on the line 42—42 of Fig. 36.

Figure 43 is a horizontal sectional view taken on the line 43—43 of Fig. 44.

Figure 44 is a horizontal section taken on the line 44—44 of Fig. 36, and showing in detail part of the operating mechanism for the recording device; and Figure 45 is a vertical sectional detail view taken on the line 45—45 of Fig. 36.

The apparatus represented more particularly in Figs. 1 to 16 comprises a frame 5 preferably made of sheet steel. This frame carries a nest chamber 1 provided with an opening 2 in its bottom through which falls the egg laid by the hen in the nest. The nest chamber is also provided with a few slots 3 for ventilation and illumination and with a sliding door 4 serving for inspection and cleaning. On the top the nest chamber is closed by the top wall of the frame.

In the frame 5 is formed a passage leading to the nest chamber. This passage comprises a floor 6 having lateral flanges 7 and 8 provided each with a hole 9 and 10, respectively, into which engages rods 11 and 12, respectively (Fig. 5). These two rods are carried by the lateral walls 13 and 14 of the frame, which are provided for this purpose with two series of holes 15 (Fig. 1) disposed at different heights to be able to vary the height of the floor of the passage by introducing the rods 11 and 12 into one or the other of these holes. The passage comprises moreover two lateral walls 16 and 17 in each of which are journaled two screws 18 screwing into the frame. By turning these screws, it is possible to approach the two walls towards each other or to move them away from each other for the purpose of decreasing or increasing the width of the passage.

Figure 3:
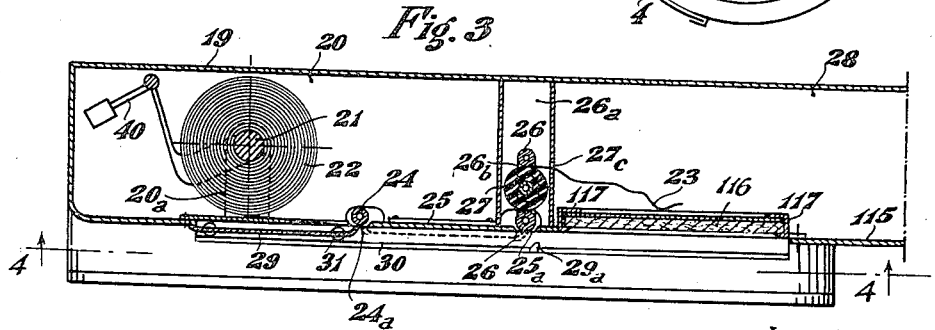
Figure 3 is a longitudinal section of the recording device drawn to a larger scale, and taken also on the line 1—1 of Fig. 2.

The passage leading to the nest chamber is closed on the top by a casing 19 containing the members of the recording device for registering the hen which has laid an egg (Fig. 3). This casing comprises a compartment 20 in which a shaft 21 carrying a paper roll 22 is rotatably mounted on two brackets 20a. The paperband 23 is guided by a roller 24, traverses a slot 24a, passes underneath a plate 25, then traverses a slot 25a to pass into the compartment 26a between the rollers 26 and the driving cylinder 27, whereafter it passes through the slot 27c into the compartment 28. A lateral door 19a (Fig. 16) permits inspection of the interior of the three compartments 20, 26a and 28.

Below the plate 25 the paper band will be marked by the printing roller carried by the hen, as will be described later, after the hen has laid an egg and leaves the nest. A lid 29 can slide along the horizontal rails 30 carried by the casing 19, by means of rollers 31. A horizontal rack 32 (Fig. 4) is carried by the lid 29 and meshes with a pinion 33 (Fig. 1) carried by the frame 5. This rack is fixed to the lid 29 by means of rods 32a traversing a slot 32b provided in the lateral wall of the casing 19. When the wheel 33 is made to rotate, in the manner as will be described later, the lid 29 moves along the rails 30 in order to occupy either the position shown in full lines in Fig. 3 or that shown in dotted lines in which it covers the portion of the paper band which is exposed beneath the plate 25.

The driving cylinder 27 for the recording paper is preferably made of rubber. It is mounted on a shaft 34 turning in brackets as 26b, and Figs. 3 and 11; this cylinder is connected to the shaft by a device permitting it to turn in one direction only. For this purpose a toothed wheel 35 and ratchet wheel 36 are keyed to the shaft 34, the ratchet 36 cooperating with a pawl 37 (Fig. 10) pivoted as shown, on a metal support 38 of the rubber roller 27. A spring 39 ensures the contact of the pawl 37 with its ratchet. When the shaft 34 turns in the direction of the arrow f, the ratchet acts on the pawl to communicate the rotation of the shaft to the roller 27 which in turn acts on the paper band to unroll it for a certain amount from the paper roll 22. When the ratchet turns in opposite direction, the pawl slides over the teeth thereof and the roller 27 is held against rotation by a ratchet wheel 27a fixed to the support 38 and cooperating with a pawl 27b carried by one of the brackets 26b.

The attachment of the pawl 27b to the bracket, as 26r, may be the same as the attachment of the pawl 37 to the support 28, but for this purpose said bracket may be constructed wider or with an extension, not shown. In order to have the paper band always well tensioned, the paper roll 22 is subjected to the action of a braking device 40 (Fig. 3) so that the driving roller 27 has to overcome a certain resistance for advancing the paper.

The described members of the recording device are actuated by the following mechanism: At the entrance of the passage leading to the nest there is disposed a perch 41 on which the hen is forced to sit when going into the nest. This perch is carried by two levers 42 pivoted on a rod 43 traversing the walls 13 and 14 of the frame 5. The weight of the levers 42 is distributed so that their arms 42a are heavier than the arms 42b and the perch, these levers having thus the tendency to turn in the direction of the arrow i (Fig. 6).

A pin 42c maintains them in substantially horizontal position.

An arm 44 is pivoted on the rod 43 (Fig. 6). This arm is provided with two toothed segments 45 and 46. The segment 45 meshes with the wheel 33 and the segment 46 wth the wheel 35. The arm 44 is also provided with two projecting fingers 47 and 48, of which the one, 48, carries a pin 50 and has its free end formed with an inclined surface 48a. In its normal position of rest, the arm 44 is supported by one of the levers 42 by the intermediary of the pin 50, as shown in full lines in Fig. 6.

In one of the walls of the frame 5 are pivoted a latch 51 and a supporting bracket 52 (Figs. 8 and 9). The latch 51 is connected by means of a rod to lever 53 the weight of which tends to turn the latch in the direction of the arrow $g$. A pin 53a limits the movement of the lever 53. The bracket 52 is connected by means of a rod to a lever 54 tending to turn the bracket in the direction of the arrow $h$, but the face 55 of the finger 47 retains the bracket 52 in the position shown in full lines in Fig. 6. The latch 51 is provided with an inclined surface 56 cooperating with the inclined surface 48a of the finger 48 on the arm 44, and with a shoulder 57 with which may engage a pin 58 carried by one of the levers 42.

In the position indicated in full lines in Fig. 6, the surface 48b of the finger 48 against which bears the latch 51, prevents the latch from turning under the action of the weight of the lever 53 and from engaging the pin 58 of the lever 42.

When a hen wants to lay an egg, it will sit down on the perch 41 before going into the nest and the perch will swing downward as indicated in dash and dot lines in Fig. 6, while the levers 42 rotate about the shaft 43. One of these levers, bearing on the pin 50, makes the arm 44 swing into the position shown in dash and dot lines. During this movement the wheels 33 and 35 are rotated by the toothed segments 45 and 46. The wheel 35 keyed to the shaft of the driving roller 27, rotates this latter as also the rollers 26 in contact with the roller 27 whereby the paper band 23 is made to advance, while passing between the rollers 26 and 27. The wheel 33, meshing with the rack 32 carried by the lid 29, moves the rack which brings the lid to its position shown in dotted lines in Fig. 3 in which this lid covers the paper situated beneath the plate 25. The rails 30 are provided with stops 29a to limit the movement of the lid 29 when the arm 44 arrives in its elevated position and to prevent the lid from moving too far by the action of its kinetic energy which would bring the rack out of mesh with the wheel 33.

When the hen abandons the perch 41, the levers 42 return to their substantially horizontal position owing to the distribution of their weight, but the arm 44 remains in its elevated position, as shown in Fig. 14, because the weight of the lever 54 has turned the bracket 52, the top face 59 of which is placed beneath the finger 47 and prevents thus the arm 44 from falling down. The bracket 52 is maintained in its position beneath the finger 47 by a lever 60 the end 61 of which stops the movement of rotation of the lever 54.

The floor 6 of the passage leading to the nest is provided with a rectangular opening 62. Within this opening there is provided a rocking member 63 fixed to a shaft 64 mounted rotatably between the walls 13 and 14 of the frame.

The shaft 64 carries also two bars 65 carrying on their free ends several curved rods forming a grille 66 (Fig. 5), and a counterweight 67 fixed to the shaft on the outside of one of the walls of the frame and which ensures that the rocking member stays in one or the other of two positions indicated in full lines and dash and dot lines in Fig. 1. A second counterweight 67a serves to balance the weight of the bars 65 and of the grille 66.

When the hen advances towards the nest, it will step on the inclined portion 68 of the rocking member. Under the action of the weight of the hen the rocking member will oscillate, the portion 68 turning downward to bear on the rod 12, so that the portion 69 is now inclined as indicated in dash and dot lines in Fig. 1, while the bars 65 turn also with the shaft 64 and the grille 66 moves in front of the entrance of the passage, preventing thus another hen from entering into the passage. As long as the hen stays in the nest, the counterweight 67 maintains the rocking member 63, the bars 65 and the grille 66 in the position indicated in dash and dot lines in Fig. 1. At the entrance to the passage, the floor 6 is provided with a downwardly extending flap 70 which closes the front portion of the frame of the apparatus and which is cut out in such manner as to permit the passage of the bars 65 and of the grille 66 during the rotation of these members. The rod 12 limits the movement of the rocking member 63 in one direction and the pin 71 limits the movement of the bars 65 on their downward rotation. As the floor 6 may be fixed at different heights of the frame, according to the rods 11 and 12 traversing certain holes 15, a series of holes is also provided in the frame for the shaft 64 and for the pin 71, so that the rocking member 63, when the floor 6 is moved, may always occupy the same position with respect to the floor 6.

The nest chamber 1 is provided with an inclined frusto-conical bottom 72. Beneath the hole 2 in the nest, the frame 5 carries an inclined egg chute 74 and 74a. A lid 75 is pivoted above the egg chute 74 in order to prevent the hen in the nest from looking through the hole 2 and perceiving the lever 60. When the hen lays an egg, this latter falls from the nest through the hole 2, rolls down the egg chute 74, swings the lid 75 open, and arrives on the end 76 of the lever 60 which is pivoted on the frame at 77. This lever 60 is subjected to the action of a force, such as that of the weight 78 which maintains the lever in the position shown in full lines in Fig. 1, where it bears against a pin 79. The weight of the egg rolling on the end 76 of the lever makes this lever swing and the egg falls on the second part 74a of the egg chute of which the bottom, which is slightly inclined in its rear portion and horizontal in its front portion, is arranged so that the egg may roll slowly towards the door 81 behind which it may be picked up.

The lever 60 (Fig. 15) comprises two rods traversing the shaft 77 on which is fixed a counterweight 78. The end 76 of the lever 60 carries a plate 80 on which rolls the egg, and a stop member 82 prevents the egg from rolling beyond the plate. The inclined bottom 72 of the nest, the egg chute 74 and 74a, the face of the lid 75 on the side of the hole 2 in the nest, the plate 80 of the lever 60 and the stop member 82 are coated with a suitable material for absorbing shocks, for example with a layer of rubber. The end 61 of one of the rods of the lever 60 coacts with the lever 54 of the bracket 52. A pin 83 stops the descending movement of the end 76 of the lever 60.

When the egg falls on the lever 60 and the end 76 thereof swings downward, the end 61 acts on the lever 54 (Fig. 14) and turns this lever and the bracket 52 in a direction contrary to that indicated by the arrow $h$ (Fig. 9). The face 59 frees the finger 47 of the arm 44 which, under the influence of its weight, falls down into its original position, shown in full lines in Fig. 6. Towards the end of the downwards movement of the arm 44, the surface 48$_a$ acts on the inclined face 56 of the latch 51 and pushes the latch backwards which releases thus the pin 58 of the lever 42. During the descending movement of the arm 44, the toothed segment 45 actuates the wheel 33 which moves the rack 32 and brings the lid 29 into the position shown in full lines in Fig. 3.

The portion of the paper band situated beneath the plate 25 is now exposed and ready to receive an impression.

The printing apparatus which is carried by the hen, is represented in Figs. 17 to 25. This apparatus comprises a support 85 attached to the body of the hen, and a rotatable arm 86 carrying a stamp subjected to the action of a spring tending to maintain it in a certain inclined position (Fig. 25).

The support comprises a member 87 preferably made of sheet steel and of which the two ends are turned up to form two flanges 88 and 89, each of which presents two apertures traversed by threaded rods 90 and 91. A curved strap 92, preferably of sheet metal, is fixed to the member 87. The support is mounted on the back of the hen by the intermediary of this strap and is fixed thereon by means of a supple or substantially resilient attaching means as for example a ribbon, a string, a thread, a leather strap, or rubber band, etc. traversing the holes 93 provided at both ends of the strap 92 and which can be tightened around the hen by means of a clamp 94.

One of the ends of each of the two rods 90 and 91 carries a cross piece 95 and 96, respectively, provided with holes 97 and 98, respectively. The distance between the two cross pieces can be adjusted, according to the size of the hen, by means of nuts 99 by which the rods are secured to the member 87. A ring 100$_a$ is attached to the string 100 so as to be movable along this string and to adjust itself underneath the body of the hen. Two further attaching means of the type of the attachment 100 are fixed to this ring and pass between the legs of the hen to be attached to one and the other of the holes 98. These attaching means are also provided with clamps to be adjustable in length and adapt themselves thus to hens of different sizes. A further attaching means 100$_c$ of the type of the previous ones and also adjustable in length, passes from each hole 97 in the member 95 underneath each wing of the hen to each hole 93, respectively, in the strap 92. Thus the printing member stays surely attached on the back of the hen.

The member 87 is provided with two lateral flanges 101 supporting a shaft 102 which carries the arm 86. This arm is preferably constituted by a piece of sheet metal 103 having in cross section the shape of a U of which the two lateral branches are traversed by the shaft 102. At its lower end the member 103 is provided with a lug 104 turned towards the interior, and the upper end 105 is also turned down at right angles. A shaft 106 is rotatably supported between this end and the lug 104. The shaft 106 carries a fork 107 for supporting a cylindrical stamp 108 rotatable about the axis 108$_a$. This fork comprises a plate 109 fixed to the shaft 106 and two lateral branches 110 carrying the stamp. The shaft 106 is secured to the member 103 by a pin 111. A character or number corresponding to the identification sign of the hen is formed several times around the surface of the stamp.

At about the middle of its length the member 103 is provided with two flanges 112 turned over at right angles towards each other; these flanges form a stop for one of the ends of a coil spring 113 of which the other end bears against the surface of the supporting member 87. This spring has therefore the tendency to urge the arm 86 in the direction indicated by the arrow $i$ (Fig. 20). The end 114 of the U-shaped piece 103 however bears on the flange 88 of the support 87 and stops the movement of the arm 86.

The passage leading to the nest has such a height that the hen must crouch while traversing it. The stamp 108 at the end of the arm 86 carried by the hen bears then against the top wall of the passage and against the various members of the recording device. It has been seen that when the hen steps towards the nest, the lid 29 covers the paper band beneath the plate 25. The stamp can therefore not touch the paper and no impression will be recorded while the hen is entering into the nest. It is only when an egg has been laid, whereby to operate the lever 60 and release the holding means, as at 52, and the finger 47 of the lever 44, that the paper band can be uncovered below the plate 25, for receiving an impression by the stamp carried by the hen.

When the hen leaves the nest after having laid an egg, the stamp rolls first over the top wall 115 of the passage, then over an inking cushion 116 which may be supported in transverse guiding rails 117 so as to be easily removed and replaced. During contact with the cushion, the stamp is inked and as the hen advances, it rolls over the paper exposed beneath the plate 25 and the characters formed on the stamp are impressed several times on the paper. When the hen leaves the nest without having laid an egg, the paper band stays covered by the lid 29 and the stamp is unable to mark the paper.

It has been seen that when the hen is in the nest, the rocking member 63 is in its position indicated in dash and dot lines in Fig. 1, the grille 66 closing the entrance into the passage. When the hen leaves the nest, it steps on the raised portion 69 of the rocking member whereby the levers 65 and the grille 66 are lowered, and the hen may leave the passage. All the members of the recording device and of its actuating mechanism are now again in their original position.

As it can happen that a hen while traversing the passage leading to the nest, holds its body in a manner that the arm 86 is not disposed in a longitudinal vertical plane, the stamp 108 is mounted on the arm 86 so that it can turn about the shaft 106. In this manner it is always sure that the contact between the stamp and the recording paper is continuously existing over the entire length of the cylindrical stamp. For this purpose the plate 109 is fixed to the shaft 106 which can turn on the member 103. In this plate are provided two slots 118 each of which being traversed by one end of the springs 119 which are fixed with their outer end to lugs 120 of the member 103. When the arm 86 is situated in an inclined longitudinal plane (Fig. 24) and the spring 113 applies the stamp 108 against the top wall b of the passage (Figs. 16 and 24), this wall makes the stamp pivot about the shaft 106 against the action of the springs 119 so that a correct impression of the characters of the stamp is always ensured. As soon as the arm 86 is not pressed any longer against the wall b, the springs 113 and 119 act to return the arm 86 and the stamp 108 into their initial positions. It is naturally necessary that the springs 119 be weaker than the spring 113, so that, when the stamp makes contact with the wall b, it turns first about the axis 106 in order to be correctly applied against the wall, before this wall swings the arm downwards against the action of the spring 113. The movement of the arm 86 against the action of the spring 113 is limited by the flange 89 against which bear the two flanges 112 of the arm.

Above the walls 16 and 17 of the passage leading to the nest, there are disposed two longitudinal ribs 128 (Fig. 16) which diminish the width of the passage near the top and together with the arm 86 prevent the hen from touching the top wall b of the passage and the members of the recording device with its back. These longitudinal ribs also limit the lateral play of the arm 86 of the printing device and prevent the stamp 108 from coming into contact with the lateral walls 128a of the passage above the ribs 128 since such contact could be harmful for the free movement of the stamp 108 about the shaft 106.

It has been seen that when the hen is in the nest and before it has laid an egg, the arm 44, the perch 41 and the levers 42 are in the position shown in Fig. 14, these levers being locked in substantially horizontal position by the latch 51 which retains the pin 58 of one of the levers 42. When the egg falls from the nest, the lever 60 releases the arm 44 and this arm releases at the same time the pin 58 of the lever 42. The perch 41, however, is not yet able to move at this moment and to actuate the arm 44 for operating again the recording device, because the levers 42 stay locked by a second locking device represented in Figs. 6 and 7.

At the interior of one of the lateral walls of the frame 5 there is pivoted an arm 121 on a pin 122 and carrying a latch 123 which traverses a hole 124 in the wall. The weight of the arm with its latch is distributed in such manner that the arm tends to turn in the direction of the arrow k (Fig. 7). The turned up edge 125 of the latch prevents however the bolt from falling out of the hole into the interior of the frame.

At the moment when the hen traversing the passage to enter into the nest makes the rocking member 63 turn, and the levers 65 are raised, a finger 126 of one of the levers 65 acts on the arm 121 and pushes the latch 123 outwardly through the wall. This latch places itself above the lever 42 of the perch and prevents therefore the lever from pivoting. The lever 42 stays thus locked until the hen leaves the nest and actuates again the rocking member 63 to make the levers 65 turn downwardly. The arm 121 is then released and owing to its weight falls into the position shown in full lines in Fig. 7.

Owing to the relatively light weight of the egg which must actuate the levers 60, these have to be very sensitive because they are to a large extent responsible for the correct operation of the apparatus. As shown in Fig. 15, these levers may be carried by two pivot screws 127 screwed into the walls 13 and 14 of the frame and cooperating with the two conical ends of the shaft 77 for reducing the friction as much as possible.

It is to be understood that the invention is not limited to the details of construction as represented on the drawings, which are given by way of example only, and that various modifications of the construction and arrangement of parts may be made without departing from the scope of the invention.

The nest may be constructed in different manners. As in practical use several of the described nests may be placed one on top of the other, the inclined bottom 72 is preferably removably attached to the upper portion of the nest. When necessary it is then always possible to remove the inclined bottom from the side of the superposed frames.

The walls 13 and 14 may be provided at their top and bottom edges with fastening flanges 129 permitting the frames to be secured to the ground, for example to the floor of a poultry house, and to have the bottom of one frame secured to the top of another frame.

Longitudinal slots 130 for illuminating the passage have been provided in the two lateral walls 16 and 17 thereof. Similar openings 131 are provided near the bottom of the frame and in the door 81 for illuminating the egg chute 74a.

A modification of the device for opening and closing the passage leading to the nest is represented in Fig. 26. The rocking member 132 is placed near the outside entrance of the passage and is provided with a toothed segment 133 meshing with a pinion 134 itself in mesh with a second pinion 135 of which the axis 136 is fixed to levers 137 carrying the grille 138 and to the counterweight 139, which ensures that the rocking member 132 stays in one or the other of its two extreme positions shown in full and in dotted lines in Fig. 26.

This construction provides the advantage that the rocking member is actuated by the hen almost as soon as the hen has entered into the passage, and only just before it leaves the passage on its way back from the nest.

The hen, stepping on the rocking member, moves the segment 133 downwards, which turns the wheel 134 actuating the wheel 135 to raise the levers 137 and the grille 138 into the position shown in dotted lines, thus closing the entrance into the passage, while, when the hen returns from the nest, its weight acts to move the members in the opposite direction and the passage is again opened.

The ratio of gearing between the pinions and the segment will be chosen in such manner that the angle through which turn the levers 137 be greater than the angle through which turns the rocking member 132.

The floor 6 and the walls 16 and 17 could be rigidly and permanently secured together and to the frame. The apparatus as a whole would then be made in different sizes having a wider or narrower, and a higher or lower passage, in order to be used for different kinds and sizes of domestic fowls.

In order to prevent sliding of the feet of the fowl while traversing the passage leading to the nest, the floor 6 can be roughened, as for instance provided with transverse groovings 140.

The second embodiment of the invention, illustrated in Figs. 27 to 35 comprises also a frame 5 which supports a nest 1 provided in its bottom with an opening 2 through which falls the egg laid by a hen.

The passage leading to the nest comprises a floor 6 and lateral movable walls 16 and 17 for varying the width of the passage, and these walls may be rendered adjustable in the same manner as the corresponding walls in the embodiment of the invention first described. A casing 19, closing the passage on the top, contains the recording mechanism.

In front of the entrance to the passage leading to the nest, the frame 5 carries on supporting arms, as 142b, a stationary perch 141, on which the hen sits down before entering into the passage. Vertical shafts 143 turning in bearings 143a and 143b are disposed within the passage on either side and near the entrance thereof.

Each one of these shafts carries a lid 142 normally maintained in the position represented in Fig. 30. The two lids form together a door for the passage. When a hen will lay an egg and desires to enter into the passage, its body pushes the lids which turn with their pivots and this movement of the lids actuates the driving arm 152 of the recording device by means of the following mechanism.

A finger 144 is fixed to each shaft 143 and acts on a lever 145 mounted loosely on the shaft 143. This lever is rotatably connected to one end of a rod 146 of which the other end is connected to a link 147 turning on a pivot 147a carried by a support 147b secured to the frame. Each rod 146 is provided with two fingers 148 engaging between themselves a bar 149. An arm 150 is secured to the bar 149 and connected to a shaft 151 pivoted between the walls 13 and 14 of the frame and carrying the driving arm 152. This arm is provided with two toothed segments 153 and 154 the teeth of which, meshing with the teeth of the wheels 33 and 35, respectively, of the recording device, may be like the teeth of the segments 45, 46.

The lower end of each shaft 143 is fixed to a lever 166 and each lever 166 is connected to one end of a retracting spring 165 of which the other end is attached to a hook 167 carried by the frame, as shown in Fig. 29.

Two further vertical shafts 169 carrying each a lid 168 and turning in bearings 170 and 171 are disposed at the rear end of the passage near the entrance into the nest 1. The portion of each of the shafts 169 extending below the floor 6 carries a finger 172 fixed to the shaft and capable of acting on a lever 173 loose on the shaft and provided with two arms 173a and 173b. A rod 177 is connected with one end to each lever 173 while it is connected near its other end to a lever 178 fixed to a shaft 179. The two rods 177 are thus rigid one with the other. A collar 180 is fixed to each shaft 143 and provided with a recess into which can penetrate the end of the rods 177 to act as bolts and prevent the shafts 143 and consequently the lids 142 from turning.

A lever 175 is secured to the lower end of each shaft 169 and is connected to one end of a retracting spring 174 of which the other end is attached to a hook 176 carried by the frame, as shown in Fig. 31.

Normally the rods 177 are in the position represented in Fig. 33 and the collars 180 are disengaged and the doors 142 free to turn. When a hen enters into the passage after leaving the perch 141, the body of the hen pushes the doors 142 which, by the intermediary of the shafts 143, actuate the fingers 144 which in turn move the levers 145 and consequently the rods 146 and the link 147. The rods 146 move the bar 149 of the lever 150 by the intermediary of the fingers 148, which lever is connected to the shaft 151 carrying the arm 152, and raise this lever into an elevated position as shown in Fig. 34 until the pawl 155 engages underneath the shoulder 154a of the segment 154. For this purpose the pawl 155 pivoted on an axis carried by the frame is arranged so as to have always the tendency to engage itself. During the movement of the arm 152 the two toothed segments 153 and 154 have turned the wheels 33 and 35 which in turn have actuated the members of the recording device in the same manner as has been described with reference to Figs. 1, 3, 4 and 6.

When the hen continues to step towards the nest, the arm 152 stays locked in its elevated position, but the springs 165 return the lids 142 to their initial position of rest. Before entering into the nest the hen must open the lids 168. These lids turning with their shafts 169, move the fingers 172 which act on the arms 173b of the levers 173 and turn these levers into the position shown in Fig. 30. This movement of the levers makes the rods 177 advance to engage into the collars 180 of the shafts 143 and to lock the lids 142 against rotation. The entrance door is therefore closed and it is impossible for another hen to enter into the passage.

When the hen in the nest has laid an egg, this egg falls through the opening 2 of the nest into the egg chute 160 and after having rolled through the inclined part 161 of the egg chute, it arrives on the horizontal portion 162 where it meets the lid 159 secured to a horizontal axis 158 fixed to a lever 157 which is connected by a rod 156 to the pawl 155. The egg turns the lid 159 producing thus, by the intermediary of the lever 157 and of the rod 156, the disengagement of the pawl 155 whereby the arm 152 is released and falls down into its normal position. In the same manner as has been described with reference to the first embodiment of the invention, the returning movement of the arm 152 actuates again the recording device to expose the record receiving portion of the paper band so that it will be marked by the stamp carried by the hen leaving the nest.

When the hen in the nest has not laid an egg, the lid 159 is not actuated and the arm 152 does not return or fall down, the pawl staying engaged. Then when the hen leaves the nest the stamp carried by the hen cannot mark the record receiving portion of the paper as this latter stays covered.

While leaving the nest, the hen opens the lids 168 in the opposite direction and by the intermediary of the fingers 172 and of the levers 173 the locking rods 177 are disengaged from the collars 180, the rods and the levers returning into their initial position shown in Fig. 33, permitting thus the lids 142 to turn freely with their shafts in order to let the hen out of the passage. After the egg has turned the lid 159 it continues to roll on the horizontal portion 164 of the egg chute where it can be picked up.

Figs. 34 and 35 show a modification of a portion of the actuating means of the recording device. The egg laid by the fowl in the nest falls through the opening in the nest on the inclined portion of the egg chute and arrives on the tilting platform 182 fixed on a horizontal axis 183 and maintained in substantially horizontal position indicated in Fig. 34, by means of the counterweight 184. Under the action of the weight of the egg, the platform 182 tilts and makes the egg fall in the portion 181a of the egg chute where it can be picked up. The tilting platform being fixed to the shaft 183 and to the lever 186 connected to the rod 187, pulls this rod in order to turn the pawl 166 and to release the arm 152.

The connection between the rod 156 or 187 and the lever 157 or 186 must have a certain play in order to permit the engagement of the pawl when the arm 152 is raised.

The modified apparatus illustrated in Figs. 36 to 45 comprises also a passageway leading to the nest and of which the floor 200 is provided with a rectangular opening 206 in which is mounted a rocking member 207. A stationary perch 201 is carried by the floor which comprises lateral ribs 202 provided with holes 203. Series of holes 204 in the wall of the frame 5 permit variation of the height of the floor supported by the bolts 205 traversing the holes 203 and one or the other of the holes 204. The rocking member 207, provided with ribs 208, is mounted on the axis 209 fixed to the floor and traversing the ribs 202 and 210. A rod 212 is pivoted to a flange 211 of the rocking member 207.

The rod 212 actuates a lever 213 pivoting on the axis 214 carried by the frame 5. A second lever 216, carried by the axis 214, is connected to the rod 218. A pawl 215 is mounted on an axis 215c (Fig. 43) carried by the arm 217 (Fig. 38) of the lever 213 and drives the lever 216 when the arm 217 is raised to its elevated position as shown in Fig. 43. For this purpose the pawl is provided with a curved portion 215b engaging a projection 216a of the lever 216. The arm 217 is provided with a stop pin 215d for the pawl 215.

The upper portion of the frame 5 contains, as in the previous examples, the recording device. A two-armed lever 219 can turn on the axis 226. One of the arms is connected to the rod 218 and the other arm actuates on the one hand the paper cover or lid 221 by means of the rod 220, and on the other hand the spool 225, through the intermediary of the pawl 222 pivoted on the arm, and of the ratchet 223 provided with three equidistant teeth. A spring 222a ensures the contact of the pawl 222 with the ratchet wheel. A retaining pawl 222b maintains the ratchet in the position in which it has been brought by the lever 219. A pin 224 on the ratchet drives the spool 225.

The operating rod 220 is connected to a lug 227 of the lid 221. The shaft 228 carries the recording paper roll 229, which is controlled by a brake, as shown in Fig. 36. The paperband 230 rolls off from the roll 229 and passes beneath the guiding plates 231 and 231a and above the lid 221 to roll up on the spool 225.

Before the entrance of a hen into the passageway the mechanism is in the position illustrated in Figs. 36, 37 and 38. The hen enters into the passage after having left the fixed perch 201 and steps successively over the floor 200, over the horizontal portion and over the inclined portion of the rocking member 207 which owing to the weight of the hen is made to tilt. The shock absorbing cushion 242 of the rocking member abuts without noise and shocks against the bar 244. The portion of the rocking member which was formerly inclined is now horizontal while the other portion is inclined. During this movement of the rocking member the rod 212 has turned the lever 213 and the counterweight 241 fixed to the lever is arranged to maintain the rocking member in one or the other of its two extreme positions. The lever 213, acting through the intermediary of the link 238, has raised the grille 239 constituted by two bars sliding in guides 240 and has closed the entrance into the passage. On the other hand, by the intermediary of the pawl 215, pivoted on the arm 217 of the lever 213, this lever has raised the lever 216. The surface 216b of this latter lever, having encountered the surface 232b of a pawl 232 pivoted on the axis 232a, has progressively pushed this pawl backwards until it has passed the surface 232b permitting thus the pawl to return into its initial position and to engage underneath the projection 216a of the lever 216 which is thus maintained in its position.

During this movement of the lever 216 the rod 218 has turned the lever 219 which, by the intermediary of the rod 220, has pushed the lid 221 into the position in which it covers the recording band 230 exposed beneath the plate 231. The pawl 222, sliding over the ratchet 223, engages with the following tooth of the ratchet which is maintained immobile during this movement as also the spool 225, by the retaining pawl 222b.

When the hen continues to step towards the nest and leaves the rocking member, the system formed by the rocking member 207, rod 212, lever 213, counterweight 241, pawl 215, rod 238, and grille 239, is maintained in its new position. When the hen has entered into the nest and lays an egg this latter falls through the opening in the nest into the egg chute and rolling down the egg chute encounters a lid 236 fixed to its axis 237 and turns the lid and the axis which, by intermediary of the arm 235 fixed to the axis 237, and of the rod 234, one end of the rod being mounted on a pin carried by said arm, as shown in Fig. 44 (see also Fig. 36), the other end of the rod being mounted on a pin 232c of the pawl 232. This structure and action produces the release of the pawl 232, so that the lever 216 and the rod 218 fall down, said latter lever being disengaged from the pawl 232, and the recording device is actuated, through the lever 219, the weight of the rod 218 and of the lever 216, being suitably established for this purpose. Thus, the lever 216, rod 218, lever 219, and its pawl 222, rod 220, and lid 221, occupy again their initial positions illustrated in Figs. 36, 37 and 38, the lever 216 bearing on the stop 248, and the recording band is exposed for receiving an impression. While returning into its initial position, the pawl 222 has turned the ratchet 223 which drives the spool 225 by its pin 224 and produces thus the advance of the paper band 230. During this movement, the system which includes the rocking lever 207, grille 239, has remained in its position in which the grille closes the entrance to the passage.

While leaving the nest chamber, the hen steps successively over the floor 200, over the horizontal portion and over the inclined portion of the rocking member 207, producing thus the rotation of the rocking member in the direction opposite to that in which it was turned while the hen has entered into the nest, and the shock absorbing cushion 243 abuts against the bar 245. The system which includes the rocking member, grille, is now again in its initial position illustrated in Figs. 36 and 38, opening the passage to permit the hen to leave the apparatus. While stepping through the passage on its way out from the nest, the hen has marked the recording band by means of the rotatable stamp which it carries on its back. When the lever 213 moves back into its initial position, the portion 215b of the pawl 215 slides over the face 216b of the lever 216 (Fig. 43) so that the pawl 215 turns about its axis 215c until this pawl, having passed the projection 216a, engages again with the lever 216. The entire mechanism is now again in its initial position illustrated in Figs. 36, 37 and 38 and another hen can enter into the passage and into the nest chamber.

When the hen which has entered into the nest, did not lay an egg, the lid 236 will not be actuated and the pawl 232 remains engaged with the lever 216 which does not fall down; the record receiving portion of the paper band stays therefore covered by the lid 221 and cannot be marked by the stamp carried by the hen as it leaves the nest.

While I have shown and described several preferred forms of identification nests, it will be understood that the invention is not limited to the details of construction as represented in the drawings and that these may vary without departing from the scope of the following claims.

I claim:

1. An identification nest for domestic fowls comprising a nest chamber, a passageway leading to the nest chamber, record receiving means in the passageway, a lid movable to cover or expose said means, operating means connected to said lid and acted upon by a fowl on its way to the nest chamber for moving said lid to cover the record receiving means, a pivoted member adapted to be moved by the egg laid by the fowl, and means operatively connecting said pivoted member and said operating means whereby the record receiving means is exposed upon movement of said pivoted member and adapted to be acted upon by the fowl as it leaves the nest.

2. An identification nest for domestic fowls comprising a nest chamber, a passageway leading to the nest chamber, record receiving means in the passageway, a lid movable to cover and to expose said means, operating means connected to said lid and arranged to be actuated by a fowl as it enters into the nest for covering the record receiving means, a door controlling the entrance into the passageway, a member pivoted in the passageway and adapted to be moved by the fowl stepping through the passageway, an operative connection between said member and the door to close the door when the fowl passes into the nest chamber and to open the door when the fowl leaves the nest chamber, a pivoted member adapted to be moved by the egg laid by the fowl, and means operatively connecting said pivoted member and said operating means whereby the record receiving means is exposed upon movement of said pivoted member and adapted to be acted upon by the fowl as it leaves the nest.

3. An identification nest for domestic fowls comprising a nest chamber, a passageway leading to the nest chamber, a door controlling the entrance into the nest chamber, a pivoted perch situated in front of the entrance to the passageway, record receiving means located in the passageway, a cover member movable to cover and to expose the record receiving means, an operative connection between said perch and said cover member whereby the cover member is moved to cover the record receiving means upon movement of the perch under the weight of a fowl, a rocking member movable under the weight of a fowl and arranged to occupy either of two positions, means operatively connecting said rocking member to the door to move the door for closing the entrance into the passageway upon the fowl passing to the nest chamber and moving the rocking member into one of its positions and to open the entrance upon the fowl leaving the nest chamber and moving the rocking member into the other of its positions, a pivoted member adapted to be moved by the egg laid by the fowl, and means operatively connecting said pivoted member and said operative connection whereby the record receiving means is exposed upon movement of said pivoted member and adapted to be acted upon by the fowl as it leaves the nest.

4. An identification nest for fowls comprising a nest chamber, a passageway leading to the nest chamber, a door controlling the entrance into the nest chamber, a pivoted perch situated in front of the entrance to the nest chamber, a movable record receiving band in the passageway, a cover member movable to cover and to expose the record receiving band, an arm operatively connected to said cover member and to said perch whereby said arm is raised to move the cover member to cover the record receiving band upon movement of the perch under the weight of a fowl, means for locking the arm in the raised position in which the record receiving band is covered, a rocking member within the passageway, said rocking member being movable under the weight of a fowl and arranged to occupy either of two positions, means operatively connecting the rocking member to the door for moving the door to close the entrance to the passageway upon the fowl passing to the nest chamber and moving the rocking member in one direction and for moving the door to open the passageway upon the fowl leaving the nest chamber and moving the rocking member in the other direction, a pivoted member adapted to be moved by the egg laid by the fowl, and means operatively connecting said pivoted member to said locking means for releasing said locking means upon movement of said pivoted member whereby to permit said arm to fall down under the action of its weight and to move said cover member for exposing the record receiving band which is acted upon by the fowl as it leaves the nest chamber.

5. An identification nest for domestic fowls comprising a nest chamber, a passageway leading to the nest chamber, a door controlling the entrance into the passageway, a pivoted perch situated in front of the entrance, a record receiving band movable through the passageway, a lid movable to cover and to expose the record receiving band, an arm operatively connected to said lid and to said perch, one way driving means connecting said arm to the record receiving band, said perch being moved under the weight of a fowl whereby the arm is raised and moves said lid to cover the record receiving band and the record receiving band is made to advance, means for locking the arm in raised position, a rocking member within the passageway, said rocking member being movable under the weight of a fowl and adapted to occupy either of two positions, means operatively connecting the rocking member and the door whereby the door is closed upon the fowl passing to the nest chamber and moving the rocking member in one direction and opened upon the fowl leaving the nest chamber and moving the rocking member in the other direction, a pivoted member adapted to be moved by the egg laid by the fowl, and means operatively connecting the pivoted member to the locking means to release the locking means upon movement of said pivoted member, thereby permitting said arm to fall down under the action of its weight to retract said lid from the record receiving band, the band being acted upon by the fowl as it leaves the nest chamber.

6. In an identification nest for domestic fowls comprising a nest chamber, a passageway leading to the nest chamber, a door controlling the entrance into the passageway and adapted to be moved by a fowl as it enters into the passageway, record receiving means located in the passageway, a lid adapted to cover or to expose said record receiving means; means operatively connecting said door and said lid whereby the lid is moved to cover the record receiving means upon movement of the door caused by the fowl entering into the passageway, a rocking member within the passageway adapted to be moved by the fowl traversing the passageway, a bolt member operatively connected to said rocking member and cooperating with the door to lock the door in closed position upon movement of the rocking member in one direction and to release the door upon movement of the rocking member in the other direction, a pivoted member adapted to be moved by the egg laid by the fowl, and means operatively connecting the pivoted member and said operating means whereby the lid is moved to expose the record receiving means upon movement of the pivoted member caused by the egg, said record receiving means being then adapted to be acted upon by the fowl as it leaves the nest chamber.

7. In an identification nest for domestic fowls comprising a nest chamber, a passageway leading to the nest chamber, a door controlling the entrance to the passageway and adapted to be moved by a fowl as it enters into the passageway, a record receiving band movable through the passageway, a lid adapted to cover or to expose the record receiving band; means operatively connecting said door to said lid and to the record receiving band whereby the lid is moved to cover the record receiving band and the record receiving band is made to advance upon movement of the door caused by a fowl entering into the passageway, a rocking member within the passageway, a bolt member operatively connected to said rocking member and cooperating with the door to lock the door in closed position upon movement of the rocking member in one direction and to release the door upon movement of the rocking member in the other direction, a pivoted member adapted to be moved by the egg laid by the fowl, and means operatively connecting the pivoted member and the first mentioned means whereby the lid is moved to expose the record receiving band upon movement of the pivoted member caused by the egg, said band being then adapted to be acted upon by the fowl as it leaves the nest chamber.

8. An identification nest for domestic fowls comprising a nest chamber, a passageway leading to the nest chamber, a rocking member within said passageway, said rocking member being movable under the weight of a fowl and being adapted to occupy either of two positions, a door controlling the entrance to the passageway and operatively connected to said rocking member whereby the door is closed upon the fowl passing to the nest chamber and moving the rocking member in one direction and opened upon the fowl leaving the nest chamber and moving the rocking member in the other direction, record receiving means located in the passageway, a lid movable to cover or to expose said means, lid actuating means operatively connected to the rocking member whereby the lid is moved to cover the record receiving means upon the fowl passing to the nest chamber and moving the rocking member in one direction, means for locking said lid actuating means against the action of its weight in the position in which the lid covers the record receiving means, a pivoted member adapted to be actuated by the egg laid by the fowl, and means operatively connecting said pivoted member and said locking means whereby the locking means is moved to release the lid actuating means upon movement of the pivoted member caused by an egg, said lid actuating means being moved under its weight when released to make the lid expose the record receiving means, the last mentioned means being acted upon by the fowl as it leaves the nest chamber.

9. An identification nest for domestic fowls comprising a nest chamber, a passageway leading to the nest chamber, a rocking member within said passageway, said rocking member being movable under the weight of a fowl and arranged to occupy either of two positions, a record receiving band movable through the passageway, a lid movable to cover or to expose the record receiving band, means operatively connecting said rocking member to said lid and to the record receiving band, said means being actuated upon the fowl passing to the nest chamber and moving the rocking member in one direction whereby the lid will be moved to cover the record receiving band, locking means for holding said actuating means against the action of its weight in the position in which the record receiving band is covered by said lid, and a pivoted member adapted to be actuated by the egg laid by the fowl, said pivoted member being connected to said locking means whereby the locking means is released upon movement of the pivoted member caused by an egg to permit said actuating means to move owing to the action of its weight to thereby advance the record receiving band and to move the lid for exposing the record receiving band, said band being acted upon by the fowl as it leaves the nest chamber.

10. An identification apparatus for hens comprising a nest chamber having an entrance and exit passageway communicating therewith, a record receiving device disposed in the passageway, a movable lid for said device, means cooperating with the lid and operable by a hen as she enters the chamber so as to cover said device, a pivot member, a lever pivoted on said member and adapted to be moved by an egg laid by the hen, and means cooperating with said lever and the first mentioned means whereby to move the lid for exposing said device, so that the latter may be acted upon by the hen as she leaves the chamber.

11. An identification apparatus for hens including in combination a housing comprising a nest chamber and having an entrance and exit passage including a footway and having a relatively low top, a record receiving device carried by said top and having an oppositely movable bottom cover, cover operating elements adapted to be actuated by a hen on her way to the chamber so as to cover said device, egg-operated means pivotally mounted in said housing and having a portion disposed below said chamber, and means operatively associating another portion of said egg-operated means and said elements, whereby when an egg laid by the hen engages the first mentioned portion said cover may be moved backwardly so that said device may then be acted upon by the hen as she leaves said chamber.

12. An identification nest for fowls comprising in combination a housing including a nest chamber and having a passage communicating therewith, said passage including a footway for a fowl and having a relatively low top, said chamber having an egg delivery opening therein; a record receiving device carried by said top and having an oppositely movable cover therebelow, cover operating elements adapted to be actuated by a fowl on its way to the chamber so as to move the cover into covering position, egg-operated means pivotally mounted in said housing and having a portion disposed below said opening; and means operatively associated with another portion of said egg-operated means and with said elements, whereby when an egg laid by the fowl reaches the first mentioned portion said cover may be moved backwardly to uncover said device, so that the latter may then be acted upon by the fowl as it leaves said chamber.

13. An identification nest for fowls comprising in combination a nest chamber having a passageway communicating therewith, said chamber having an egg delivery opening, a record receiving device disposed in the passageway and having an oppositely movable cover; an entrance control door; a pivoted perch disposed at the entrance to the passageway, means operatively associating said perch and said cover, said means including a pivoted arm, so that the weight of a fowl in passing over the perch may raise said arm and move the cover into covering position; locking means for holding said arm raised; an oppositely rockable member disposed in the passageway, means connecting said member and the door, so that as the fowl passes along the passageway said member may be rocked in one direction to close the door behind the fowl; said member being also rockable in the opposite direction to open the door as the fowl leaves the chamber; egg-operated means including a pivoted lever having one end disposed below said opening, means operatively associating the opposite end of said lever and said locking means, so that as an egg laid by the fowl drops on the first mentioned end said locking means may be released to gravitationally drop said arm for moving the cover to uncover said device, whereby said device may then be acted upon by the fowl as it leaves said chamber.

14. A trap nest and identification means for fowls comprising in combination a nest chamber having a passage leading thereto; record receiving means disposed at the top of the passage and having a movable covering lid, means operable by a fowl, as it walks inwardly through the entrance end of the passage for moving the lid forwardly to cover said receiving means; a rocker forming a part of the floor of the passage towards the other end thereof, said rocker having passage closing means attached thereto, so that the passage may be closed as the fowl enters the chamber, said rocker adapted also to move said passage closing means for opening the passage as the fowl leaves the chamber; and means operable by an egg laid by the fowl for moving said lid backwardly, so that said receiving means may then be acted upon by a fowl that lays an egg.

PHILEMON DUARTE D'ALMEIDA.